No. 681,694. Patented Sept. 3, 1901.
W. S. GORTON.
TUBE WELDING MACHINE.
(Application filed Jan. 26, 1901.)
(No Model.) 2 Sheets—Sheet 1.
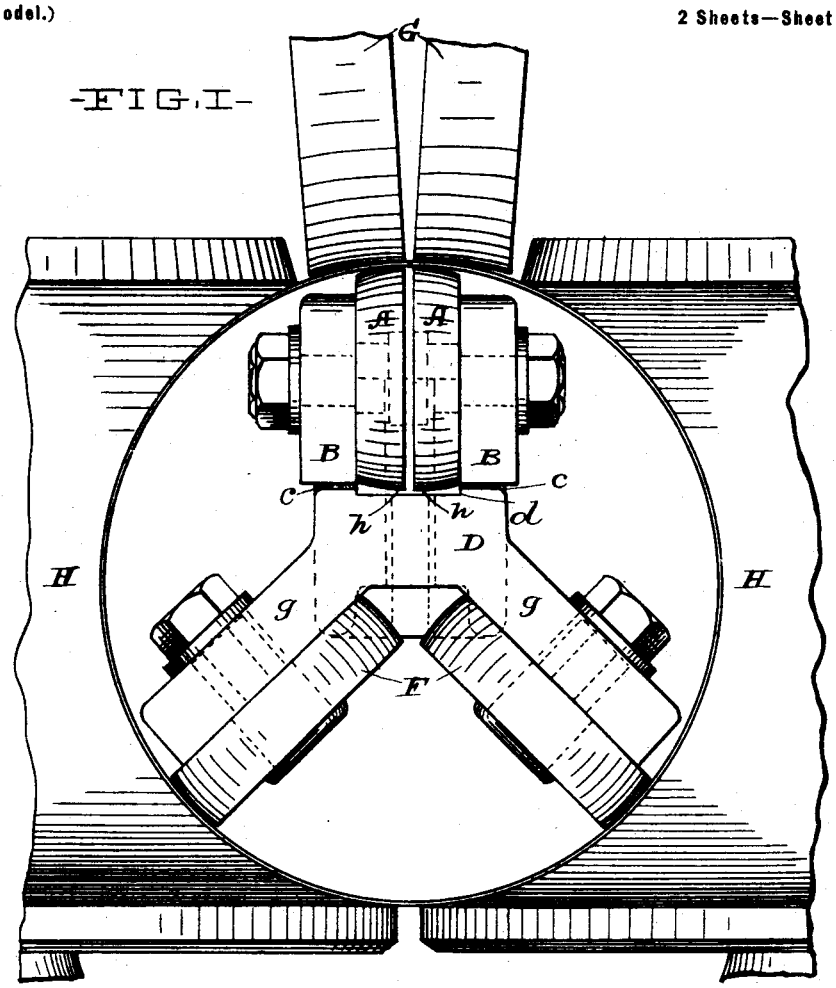
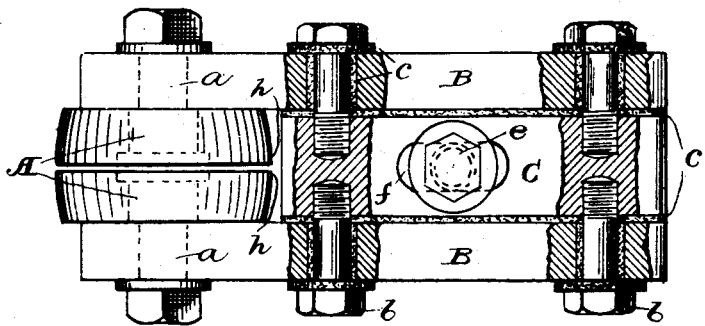
Witnesses,
J. C. Turner
D. T. Davis
Inventor
William Searles Gorton
By
Thos. B. Hall
Atty.

No. 681,694. Patented Sept. 3, 1901.
W. S. GORTON.
TUBE WELDING MACHINE.
(Application filed Jan. 26, 1901.)
(No Model.) 2 Sheets—Sheet 2.
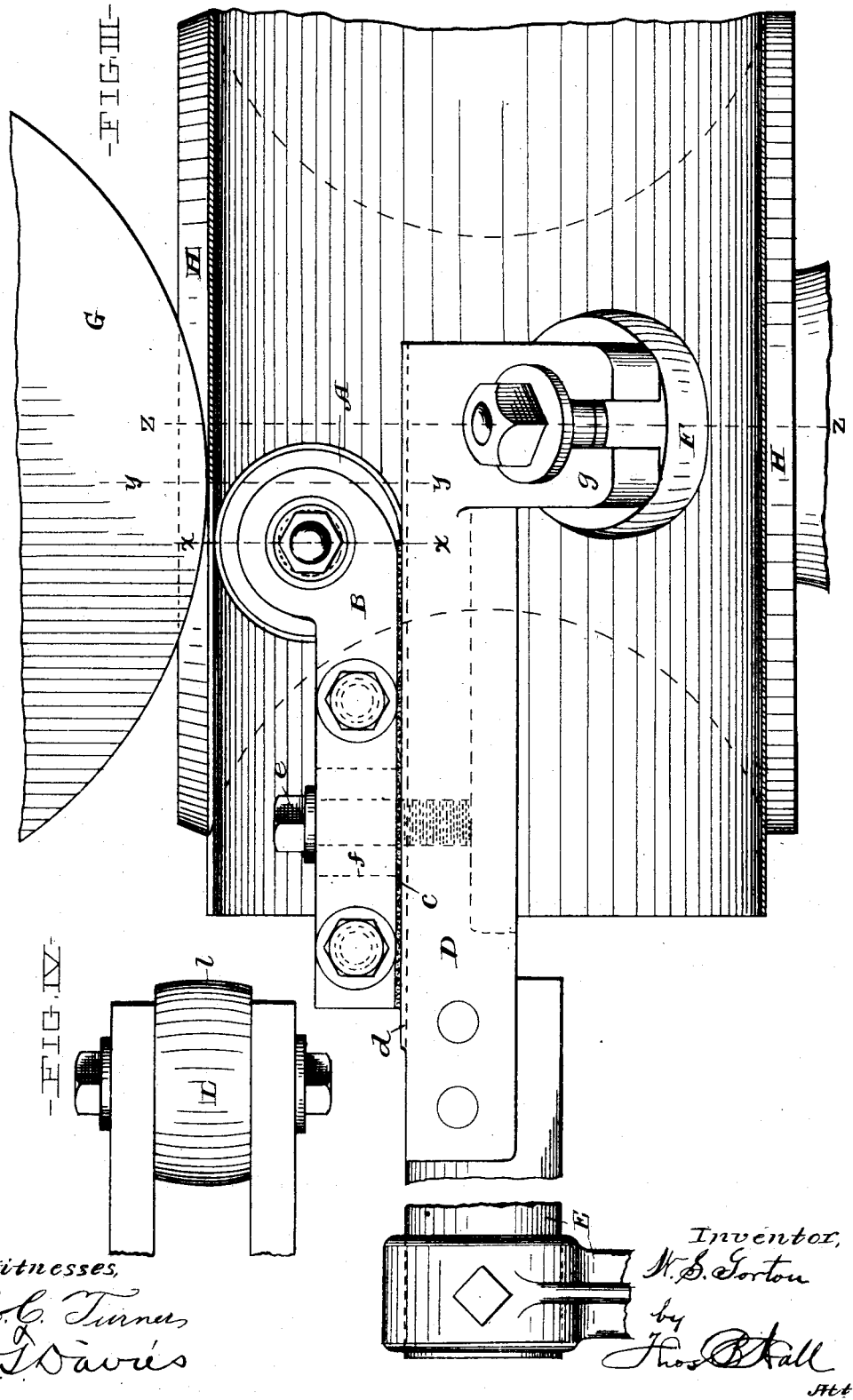

UNITED STATES PATENT OFFICE.

WILLIAM S. GORTON, OF CLEVELAND, OHIO.

TUBE-WELDING MACHINE.

SPECIFICATION forming part of Letters Patent No. 681,694, dated September 3, 1901.

Application filed January 26, 1901. Serial No. 44,798. (No model.)

*To all whom it may concern:*

Be it known that I, WILLIAM SEARLES GORTON, a citizen of the United States, and a resident of Cleveland, county of Cuyahoga, and State of Ohio, have invented a new and useful Improvement in Tube-Welding Machines, of which the following is a specification, the principle of the invention being herein explained and the best mode in which I have contemplated applying that principle, so as to distinguish it from other inventions.

The object of the invention is to provide improvements in electric tube-welding machines, with special reference to mandrel means.

The nature of the invention consists of the means described in the following specification and particularly pointed out in the claims.

The annexed drawings and the following description set forth in detail certain mechanism embodying the invention, such disclosed means constituting but one of various mechanical forms in which the principle of the invention may be used.

Figure I is an end elevation of one form of the mandrel means, such end being that from which the tube comes in its welding passage, such tube being also shown together with fractional parts of two contact devices and of two compressing devices. Fig. II is a detail view showing in top plan said form of mandrel means and in partly-broken-away top plan the immediately-connected framework. Fig. III is a side elevation of said form of mandrel means and also shows a portion of the tube undergoing electric butt-welding, such view representing a part of one contact device and also a part of one compressing device, such view also showing a part of the mandrel-frame-fastening device located at that end of the mandrel-frame opposite to the end shown in Fig. I. Fig. IV is a detail view of a form of mandrel means different from the form shown in the preceding three figures.

Two mandrels A are formed as individual rolls in duplicate of each other. They are located parallel with each other and their axes $a$ in line with each other; but they are sufficiently separated from each other to be electrically free from each other. Each of said axes is journaled in a bar B, parallel with its mandrel-roll, such two bars being secured to an intermediate bar C by fastening devices $b$, parallel with said axes. Insulating material $c$ is interposed between the members and fastening devices of the framework, so as to effectually insulate each mandrel-roll thereon. The peripheries of the mandrel-rolls fit within the longitudinal central recess $d$ of beam D, and said bar C is secured in longitudinal adjustment on such beam by screw-bolt $e$, passing freely through longitudinal vertical slot $f$, formed in bar C and engaging with beam D. That end of beam D farthest from the mandrel-rolls is connected to any suitable fastening device E. The opposite end portion of beam D is provided with two depending hangers $g$, diverging from each other, so as to be located in planes substantially at right angles to one another and substantially at angles of forty-five degrees inclination to the horizontal axes of the mandrel-rolls. Each of such hangers has journaled therein the axis of a mandrel-frame-supporting roll F, such rolls F being formed in duplicate and located relatively to each other and to the mandrel-rolls at angles substantially same as their hangers $g$.

Two electric conducting-rolls G, only certain immediate portions of which are shown in the drawings, are located above the mandrel-rolls in planes slightly angular to the latter, such contact-rolls having a clear space between each other and adapted to bear, respectively, upon the opposite edge portions of the butt-joint of a tube to be welded, while free from bearing upon such joint, each of such contact-rolls adapted to have contact with only one of said two edge portions, and the construction of the machine being such that the electric current is transmitted across the joint by said edge portions when the tube is being welded. These two contact-rolls are in equal degree slightly inclined to the plane determined by the longitudinal tube-joint and the axis of the tube, such inclination serving to aid in properly bringing together the tube-joint edges without bending the latter. The vertical plane passing through the axes of the mandrel-rolls is relatively to the passage of the tube through the machine before the vertical plane passing through the axes of the contact-rolls, such two planes being parallel with each other and at right angles to the line of the tube movement. Hence the extreme projection of the mandrel means from the axial line of the tube is located relatively to the direction of the tube movement before the extreme projection of the contact means toward said axial line. In Fig. III said vertical plane of the axes of the mandrel-rolls is indicated by the dotted line $x\ x$, and said vertical plane of the axes of the contact-rolls is indicated by the dotted line $y\ y$. Preferably the distance between such two axial planes is about one-half inch; but said distance may be varied more or less from the said one-half inch, according to the diameter of the tube, its density of metal, or other premises of the particular case. The two sets of rolls are, however, relatively located so that a plane right angular to said line of movement of the tube may pass through all four rolls. Hence while the difference between the locations of said axial planes causes the edge portions of the tube to be firmly supported by the mandrel-rolls before the contact-rolls exert their greatest pressure thereon, yet the bodies of such two sets of rolls are so closely located together that the mandrel-rolls provide ample support for said extreme pressure of the contact-rolls.

The contact periphery of each mandrel-roll is formed with bevel $h$, which has its greatest projection from the roll-axis nearest the plane determined by the tube-axis and its joint, such bevel peripheries causing the immediate edge portions of the tube-joint to be subjected to the electric current exclusively of the remaining metal of the tube. Each mandrel-roll is about one-half of the width of each contact-roll, the two contact-rolls having their half-width portions, which are adjacent to each other, respectively located in vertical planes substantially over the mandrel-rolls. The space between the contact-rolls and the mandrel-rolls is of a size adapted to permit the tube edge portions to be in proper compression between the two sets of rolls during the normal operation of the machine.

The tube-compression rolls H have only so much of their portions shown in the drawings as are nearest to the mandrel-rolls and are sufficient to illustrate their subject-matter. Each of such compression-rolls has a concave face adapted to receive and partially inclose the tube. They work conjointly with the coöperative members of the machine and are adapted to make a definite and material upset on each of the two meeting edge portions of the tube. The axes of the tube-compression rolls H and the axes of the mandrel-frame-supporting rolls F are located in the same vertical plane at right angles to the line of the tube movement, such plane being indicated by dotted line $z\ z$ in Fig. III and being parallel with line $y\ y$. In said Fig. III the plane indicated by line $y\ y$ is illustrated as being relatively to the passage of the tube through the machine as much before the plane indicated by line $z\ z$ as the plane indicated by line $x\ x$ is illustrated as being before the plane indicated by line $y\ y$; but the degree of distance of such three planes from each other may, provided such planes maintain relative order of sequence, as described, vary according to the premises of each particular instance, which premises include the diameter of the tube, the thickness of the metal of the tube, and the density of such metal; but while relatively to the passage of the tube through the machine the axial plane of the mandrel-rolls across the line of movement of the tube is before the axial plane of the conducting-rolls across such line, and the axial plane of the conducting-rolls across the line of movement of the tube is before the axial plane of the tube-compression rolls across such line, and the axial plane of the mandrel-frame-supporting rolls across the line of tube movement is coincident with the axial plane of the tube-compression rolls across such line, yet said four sets of rolls are relatively located so that a plane right angular to said line of movement of the tube may pass through all the eight rolls. Thereby the mandrel-rolls provide greatest projecting bearing for any certain cross-sectional part of the tube edge portions prior to the application of the greatest electrical energy of the contact-rolls to said tube edge portions, while such extreme electrical energy is exerted upon such certain cross-sectional part of the tube edge portions before the compression-rolls exert their extreme mechanical energy upon such part, and the pressure exerted by the contact-rolls is transmitted through the mandrel-rolls and their frame and the frame-supporting rolls, so as to fall upon any certain lower cross-sectional part of the tube that is directly above and supported by the axial bearing of the tube-compression rolls.

In the operation of the machine the edge portions of the butt-joint of the tube are maintained in proper relative position by the mandrel-rolls, the latter providing bearing in resistance to the pressure of the contact-rolls, such as to prevent said edge portions from being depressed or bent out of circular plane with each other. The mandrel-rolls thus sustain the edge portions of the tube in butt contact against one another, so as to permit the contact-rolls to bear down on said edge portions with desired pressure to cause the electric current to properly pass from one contact-roll to the other by transmission of the current transversely through said tube edge portions across the tube-joint, thereby heating the immediate and proper edge portions of the metal on opposite sides of said joint to the desired degree of welding heat. The tube is then subjected to the final degree of compression between the compression-rolls, which completely compresses such heated immediate edge portions of the butt-joint together and finishes the weld, as desired.

In Fig. IV of the drawings is shown a single mandrel-roll L, which may be used as a form of mandrel means in substitution for the two-part form of mandrel means shown in the other figures of the drawings. This mandrel L has a working periphery *l*, which is beveled so as to have its greatest projection from the roll-axis in its central transverse plane corresponding to the bevels *h* of two-part mandrel means.

By the term "tube" throughout the foregoing description and the following claims I do not restrict my meaning to an article curved or of any particular size in cross-sectional form, and I include under said term an article of any appropriate size and angular form in cross-section.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In a tube-welding machine, the combination of electric contact means, and mandrel means which provide bearing for the tube edge portions in resistance to the pressure of said contact means, the extreme projection of said mandrel means from the axial line of the tube being located relatively to the direction of the tube movement before the extreme projection of said contact means toward said axial line, such mandrel means being also electrically insulated and adapted not to conduct electricity, substantially as set forth.

2. In a tube-welding machine, the combination of electric contact means, and mandrel means which provide bearing for the tube edge portions in resistance to the pressure of said contact means, together with a frame supporting said mandrel means and electrically insulated from the latter, the extreme projection of said mandrel means from the axial line of the tube being located relatively to the direction of the tube movement before the extreme projection of said contact means toward said axial line, the construction of said members and their relative insulation being such as to exclude said mandrel means from conducting electricity, substantially as set forth.

3. In a tube-welding machine, the combination of an electric-current-conducting roll, and an electrically-insulated mandrel-roll which provides bearing for the tube edge portion in resistance to the pressure of said conducting-roll, such mandrel-roll having its axis located in a plane relatively to the passage of the tube through the machine before the plane in which the axis of said conducting-roll is located, such two planes being parallel and at right angles to the line of movement of the tube, substantially as set forth.

4. In a tube-welding machine, the combination of electric contact devices, and mandrel means adapted to provide bearing for the tube edge portions in resistance to the pressure of said contact devices, tube-compressing rolls located respectively on opposite sides of said contact devices and tending to force the butt edges of the tube together, a mandrel-frame, supporting means for said frame located in the same plane across the line of movement of the tube as are the axes of said tube-compressing rolls and adapted to bear against that portion of the tube which is at that time located in said plane, substantially as set forth.

5. In a tube-welding machine, the combination of two electric-current-conducting devices respectively connected with opposite electric poles and adapted to have contact respectively with the opposite edge portions of the butt-joint of a tube, two rolls adapted to compress such tube between them and thereby force said joint edges together, mandrel means which provide bearing for said butt edge portions in resistance to the pressure of said contact devices, the extreme projection of said mandrel means from the axial line of the tube being located relatively to the direction of the tube movement before the extreme projection of said contact means toward said axial line, a mandrel-frame, supporting means for said frame located in the axial plane of said compression-rolls across the line of movement of the tube and adapted to bear upon such portion of the tube as may at any certain time be located in said plane, substantially as set forth.

6. In a tube-welding machine, the combination of two electric-current-conducting devices respectively connected with opposite electric poles and adapted to have contact respectively with the opposite edge portions of the butt-joint of a tube while free from contact with such joint, mandrel means adapted to provide bearing for said tube edge portions in resistance to the pressure of said conducting devices, a mandrel-frame, supports for said frame adapted to bear upon the tube, said conducting devices, mandrel means, frame and supports being relatively located so that a plane substantially right angular to the line of movement of the tube may pass through them all, substantially as set forth.

7. In a tube-welding machine, the combination of two electric-current-conducting devices respectively connected with opposite electric poles and adapted to have contact respectively with the opposite edge portions of the butt-joint of a tube while free from contact with such joint, two compression-rolls located respectively on opposise sides of said conducting devices and tending to force said butt edges together, mandrel means adapted to provide bearing for said tube edge portions in resistance to the pressure of said conducting devices, two supports each angular to the line of movement of the tube, a frame connecting said mandrel means and supports, substantially as set forth.

8. In a tube-welding machine, the combination of two electric-current-conducting devices respectively connected with opposite electric poles and adapted to have contact respectively with the opposite edge portions of the butt-joint of a tube while free from contact with such joint, two compressor-rolls located respectively on opposite sides of said conducting devices and tending to force said butt edges together, mandrel means adapted to provide bearing for said tube edge portions in resistance to the pressure of said conducting devices, two supports each angular to the line of movement of the tube and inclined to the axes of said compressor-rolls, a frame connecting said mandrel means and supports, said conducting devices, compressor-rolls, mandrel means, supports and intermediate frame being relatively located so that a plane substantially right angular to the line of movement of the tube may pass through them all, substantially as set forth.

9. In a tube-welding machine, the combination of two electric-current-conducting devices respectively connected with opposite electric poles and adapted to have contact respectively with the opposite edge portions of the butt-joint of a tube while free from contact with such joint, and two compressor-rolls located respectively on opposite sides of said conducting devices and tending to force said butt edges together, mandrel means adapted to provide bearing for said tube edge portions in resistance to the pressure of said conducting devices, two supports each angular to the line of movement of the tube and adapted to bear upon the latter in the axial plane of said compressor-rolls, a frame connecting said mandrel means and supports, said conducting devices, compressor-rolls, mandrel means and supports being relatively located so that a plane substantially right angular to the line of movement of the tube may pass through them all, said frame connected to a fastening device located out of said plane, substantially as set forth.

10. In a tube-welding machine, the combination of two electric-current-conducting devices respectively connected with opposite electric poles and adapted to have contact respectively with the opposite edge portions of the butt-joint of a tube while free from contact with such joint, two compressors located respectively on opposite sides of said conducting devices and tending to force said butt edges together, mandrel means adapted to provide bearing for said tube edge portions in resistance to the pressure of said conducting devices, two supports each angular to the line of movement of the tube and adapted to bear upon the latter, a frame connecting said mandrel means and supports, said conducting devices, compressors, mandrel means and supports being relatively located so that a plane substantially right angular to the line of movement of the tube may pass through them all, said conducting devices, compressors, mandrel means and supports being severally formed as rolls, substantially as set forth.

11. In a tube-welding machine, the combination of two electric-current-conducting devices respectively connected with opposite electric poles and adapted to have contact respectively with the opposite edge portions of the butt-joint of a tube while free from contact with such joint, two compressor-rolls located respectively on opposite sides of said conducting devices and tending to force said butt edges together, mandrel means adapted to provide bearing for said tube edge portions in resistance to the pressure of said conducting devices, two supports each angular to the line of movement of the tube, a frame connecting said mandrel means and supports, said frame located within the plane determined by the tube-joint and the tube-axis, said two supports having free ends adapted to bear upon the tube respectively to opposite sides of said plane, substantially as set forth.

12. In a tube-welding machine, the combination of two electric-current-conducting devices respectively connected with opposite electric poles and adapted to have contact respectively with the opposite edge portions of the butt-joint of a tube while free from contact with such joint, two compressor-rolls located respectively on opposite sides of said conducting devices and tending to force said butt edges together, mandrel means which provide bearing for said tube edge portions in resistance to the pressure of said conducting devices, the extreme projection of said mandrel means from the axial line of the tube being located relatively to the direction of the tube movement before the extreme projection of said contact means toward said axial line, two supports located angularly to each other and in the axial plane of said compressor-rolls across the line of movement of the tube and adapted to have antifrictional end bearing upon the tube, a frame connecting said mandrel means and supports and located within the plane determined by the tube-axis and the tube-joint, said two supports having their said bearing upon the tube respectively to opposite sides of said plane, substantially as set forth.

Signed by me this 24th day of January, 1901.

WILLIAM S. GORTON.

Attest:
 THOS. B. HALL,
 D. T. DAVIES.